(12) United States Patent
O'Coin

(10) Patent No.: US 11,156,314 B2
(45) Date of Patent: Oct. 26, 2021

(54) OVAL O-RING GROOVE

(71) Applicant: HAMILTON SUNDSTRAND CORPORATION, Charlotte, NC (US)

(72) Inventor: James R. O'Coin, Somers, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 1024 days.

(21) Appl. No.: 15/043,660

(22) Filed: Feb. 15, 2016

(65) Prior Publication Data
US 2017/0234465 A1    Aug. 17, 2017

(51) Int. Cl.
F16L 21/035    (2006.01)
B64G 1/48    (2006.01)

(52) U.S. Cl.
CPC .............. *F16L 21/035* (2013.01); *B64G 1/48* (2013.01)

(58) Field of Classification Search
CPC .......... F16L 21/035; F16L 17/06; F16L 17/02
USPC .......................... 285/349, 338, 347, 351, 379
See application file for complete search history.

(56) References Cited

U.S. PATENT DOCUMENTS

| | | | |
|---|---|---|---|
| 3,910,555 A | 10/1975 | Bertrem et al. | |
| 4,095,640 A | 6/1978 | Beckerer, Jr. | |
| 4,258,925 A | 3/1981 | Guyton | |
| 4,941,693 A * | 7/1990 | Spaude | F16L 25/00 285/331 |
| 5,482,297 A | 1/1996 | Burns et al. | |
| 5,564,177 A | 10/1996 | Fernandes et al. | |
| 6,505,864 B1 * | 1/2003 | Shuey | F16L 23/12 285/363 |
| 6,866,308 B2 * | 3/2005 | Issagholian-Havai | F16L 21/03 285/351 |
| 7,063,329 B2 | 6/2006 | Anderson et al. | |
| 7,311,311 B2 | 12/2007 | Hosokawa | |
| 7,500,459 B2 * | 3/2009 | Koji | F16L 5/10 123/195 C |
| 8,028,998 B2 | 10/2011 | Schleker et al. | |
| 2003/0160452 A1 * | 8/2003 | Mattsson | F16L 9/003 285/424 |
| 2006/0278377 A1 * | 12/2006 | Martins | F02B 29/0412 165/140 |
| 2008/0106092 A1 * | 5/2008 | Klein | F16L 41/02 285/5 |
| 2009/0206558 A1 | 8/2009 | Nameki | |
| 2014/0056700 A1 | 2/2014 | Rupp et al. | |
| 2014/0209074 A1 * | 7/2014 | Kahle | F16L 21/035 123/572 |
| 2014/0300105 A1 * | 10/2014 | Kalbacher | F16L 21/035 285/351 |

FOREIGN PATENT DOCUMENTS

WO    WO-2007040408 A1 *    4/2007    .............. F16L 37/02

* cited by examiner

*Primary Examiner* — Matthew Troutman
*Assistant Examiner* — Fannie C Kee
(74) *Attorney, Agent, or Firm* — Carlson, Gaskey & Olds, P.C.

(57) ABSTRACT

A fluid flow component has a fluid connection. The fluid connection has part circular end portions and extending side portions connecting the part circular end portions. A seal groove is formed in the fluid connection. The seal groove has inwardly extending components at an outer end to capture an o-ring within the seal groove. A circular o-ring has a circular cross-section received within the seal groove.

17 Claims, 3 Drawing Sheets

OVAL O-RING GROOVE

STATEMENT REGARDING FEDERALLY SPONSORED RESEARCH OR DEVELOPMENT

This invention was made with government support under Contract No. NNJ06TA25C, awarded by NASA. The Government has certain rights in this invention.

BACKGROUND OF THE INVENTION

This application relates to an o-ring groove that has a generally elongated shape.

O-rings are known seals and utilized in any number of applications. Typically, an o-ring has a circular cross-section and extends through a circle about a central axis.

O-rings are typically received in a groove in one of the two components across which a seal is provided.

While complex groove shapes have been proposed, in general, they are intended for seals with a corresponding complex cross-section, and not o-rings.

SUMMARY OF THE INVENTION

A fluid flow component has a fluid connection. The fluid connection has part circular end portions and extending side portions connecting the part circular end portions. A seal groove is formed in the fluid connection. The seal groove has inwardly extending components at outer ends to capture an o-ring within the seal groove. A circular o-ring having a circular cross-section is received within the seal groove.

A fluid system is also disclosed and claimed.

These and other features may be best understood from the following drawings and specification.

DETAILED DESCRIPTION

Figure 1:
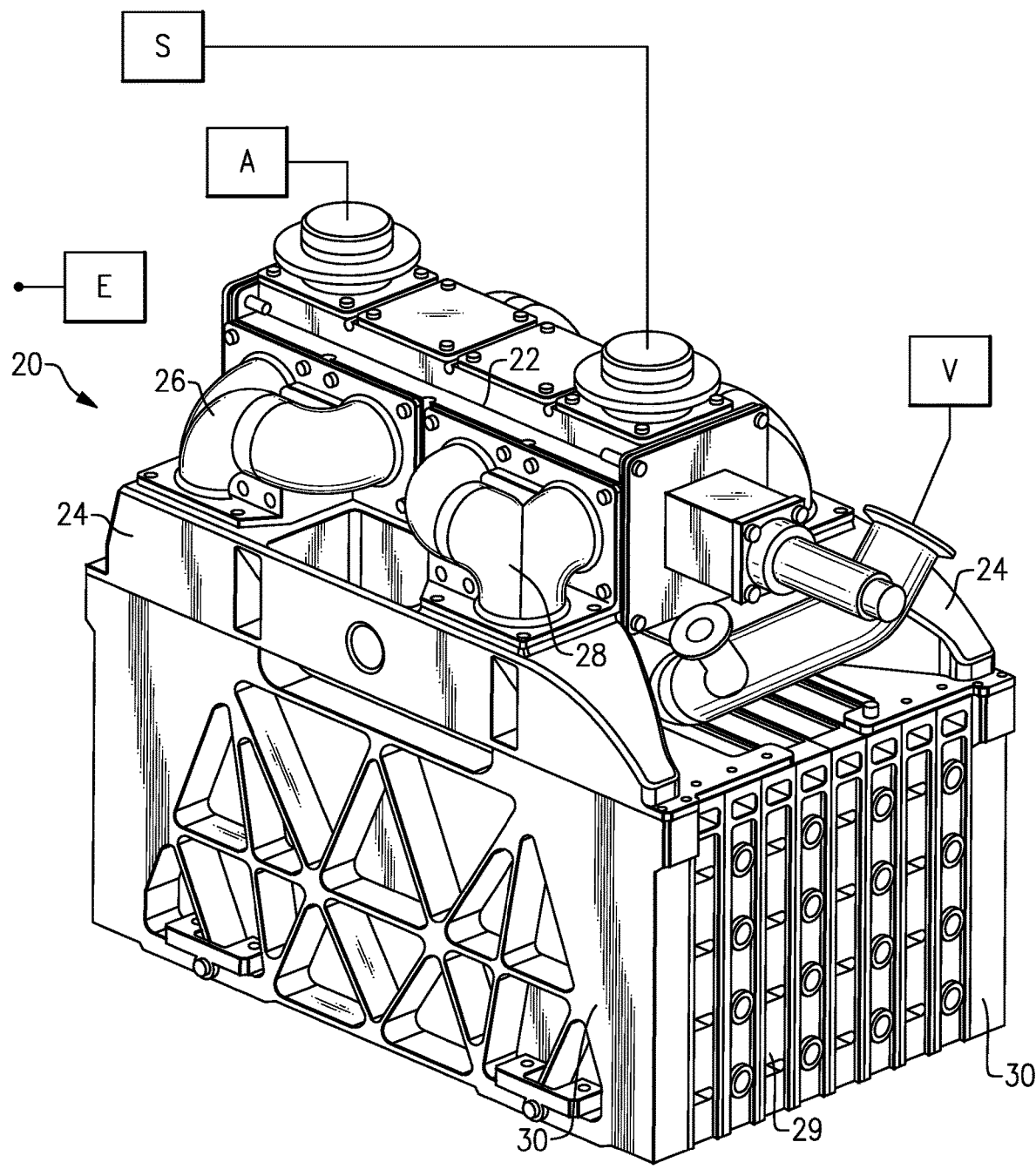
FIG. 1 is an assembly view of a system.

A fluid system 20 is illustrated in FIG. 1 incorporating a valve 22 mounted above a pair of manifolds 24. Fluid passages 26 and 28 communicate fluid through the manifold into a device 29 which is often called a heat exchanger. The heat exchanger 29 is known, and designed for use on a spacecraft and actually removes carbon dioxide and water from breathing air for use by passengers on the spacecraft.

In this system, breathing air A is passed to the heat exchanger through one end plate 30 with the other side of the heat exchanger 29 communicating with a vacuum to remove build-up carbon dioxide and water. From the heat exchanger 29, the vacuum communicates to an external environment.

When the side which had been removing carbon dioxide and water reaches a particular degree of saturation of the removed items, the valve 22 is controlled to switch the flow of the breathing air and vacuum.

The operation of valve 22 is known. The air from source A is treated in heat exchanger 29 and sent to a use S, such as breathing air on a spaceship. The vacuum from source V having purged a side of heat exchanger 29 is dumped to an environment E remote from the spaceship.

As can be appreciated, it is important to maintain a reliable fluid type connection at each of the several interfaces in the system 20.

Figure 2A:
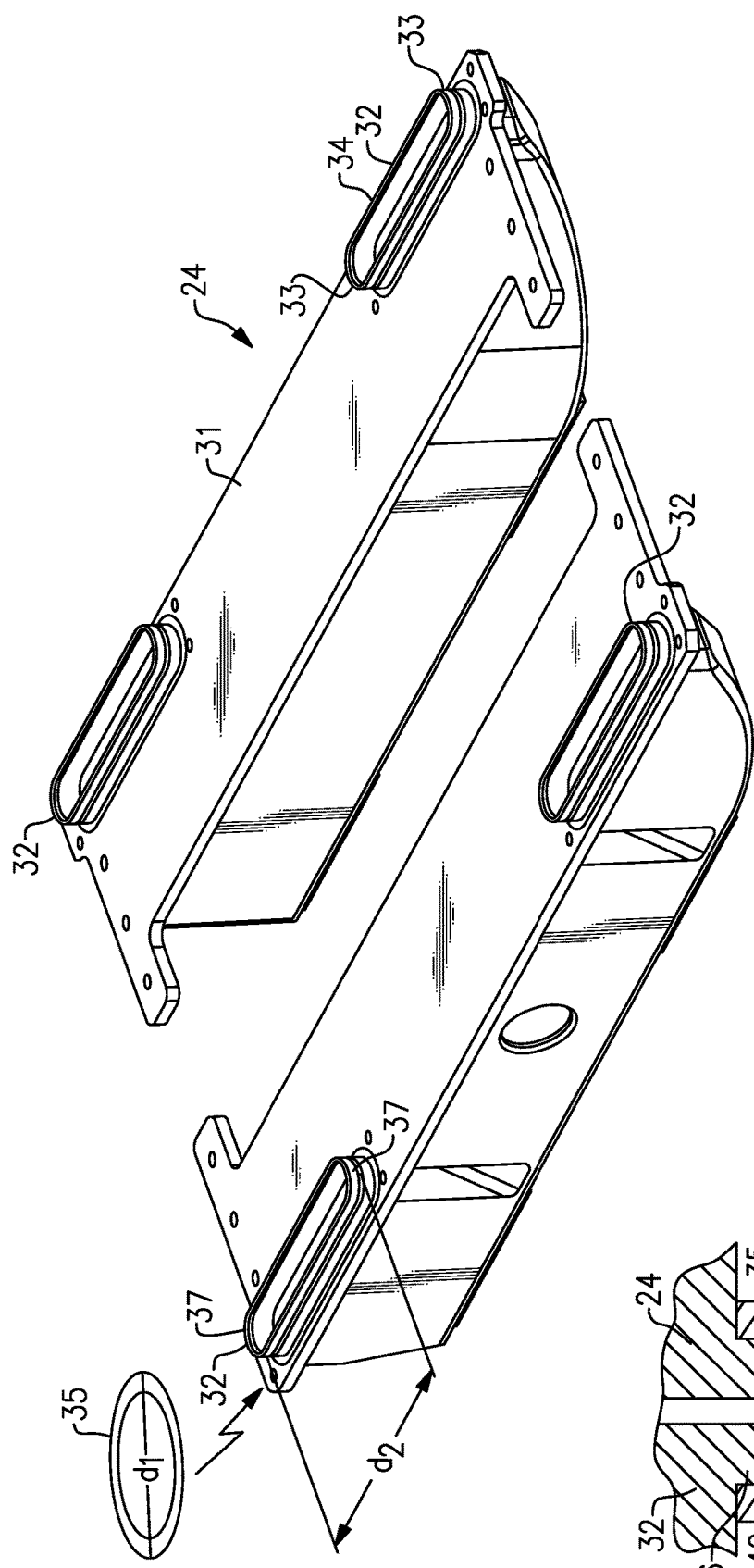
FIG. 2A shows a manifold.

FIG. 2A shows a detail of the manifolds 24. As shown, fluid connections 32 extend away from a lower face 31 of the manifold. The fluid connection 32 has curved end portions 33 and connecting relatively straight side walls 34. The fluid connection 32 is formed in this elongated shape since the fluid connections must extend through the end plates 30, and the end plates 30 are relatively thin.

Thus, to achieve the desired volumes of flow, the elongated connections 32 are utilized. It would be desirable to utilize a standard circular o-ring to seal the fluid connections 32. As known, an o-ring 35 has a circular cross-section and extends through a circle.

In one embodiment, the o-ring 35 has a diameter $d_1$ and the fluid connections extend for a distance $d_2$ between most spaced ends 37. In one embodiment, $d_1$ was 3.004 inch (7.63 centimeter) and $d_2$ was 4.237 inch (10.76 centimeter). In embodiments, a ratio of $d_1:d_2$ was less than 1.

Figure 2D:
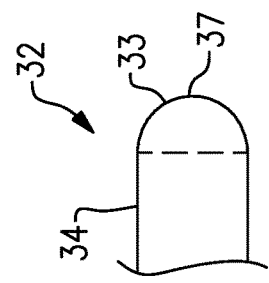
FIG. 2D shows a geometric detail.
Figure 2B:
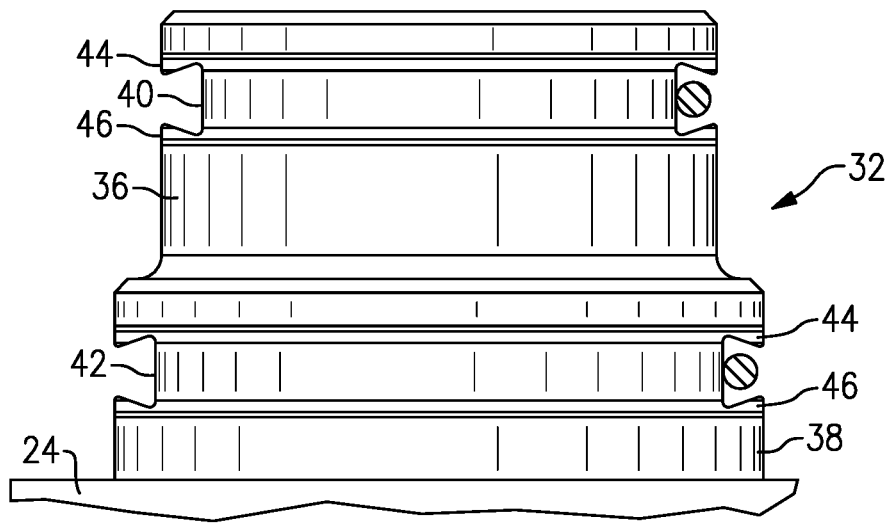
FIG. 2B is a view of a connection portion of the manifold.

FIG. 2B shows a detail of the fluid connection 32. As shown, there is a smaller inner boss 36 and a larger outer boss 38. Each are provided with an o-ring channel or groove 40/42 and having chamfered or dovetail grooves 44 and 46. The dovetails 44 and 46 retain the circular o-ring along the straight sides 34. O-rings 35 are shown in section, and in dotted lines extending across the grooves.

Figure 2C:
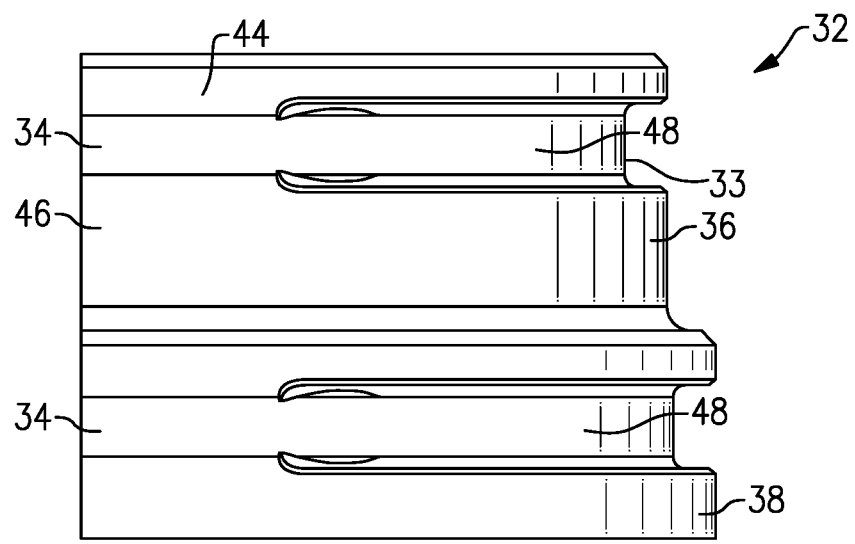
FIG. 2C shows a detail.

As shown in FIG. 2C, there are groove portions 48 associated with the curved end portions 33 which do not include the dovetails 44/46. Thus, the o-ring can be easily moved into the groove with the circular o-ring sitting within the circular portions 48 and the remainder of the o-ring extending along the straight sides 34 and being retained by the dovetails 44/46.

FIG. 2D shows a detail of the fluid connection 32. As can be seen, the relatively straight sides 34 extend to the curved end portion 33. The most spaced ends 37 are along the curved portion 33.

Figure 3:
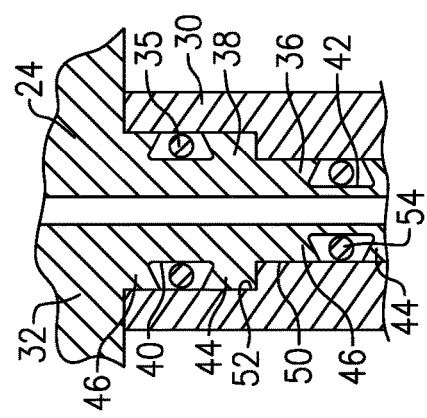
FIG. 3 shows a fluid connection.

FIG. 3 shows the fluid connection 32 communicating into end plate 30. As shown, the end plate 30 is provided with two-stepped bores 50 and 52. The inner boss 36 of the fluid connection 32 is received within bore portion 50 and the outer boss 38 is received within bore portion 52.

O-rings 35 and 54 are shown mounted in their respective grooves 40/42. The dovetails 44/46 secure the o-rings 35 within the grooves 40/42. Thus, even though a standard circular o-ring is utilized to seal on an elongated, non-circular surface 34, the o-ring is still retained in the groove and will provide adequate and reliable sealing.

This could be summarized as a fluid flow component 32 with part circular end portions 33 and extending generally straight side portions 34 connecting the part circular end portions 33. A seal groove 40/42 is formed in the fluid connection. The seal groove 40/42 has inwardly extending components 44/46 at an outer end to capture an o-ring 35/54 within the seal groove. A circular o-ring having a circular cross-section is received within the seal groove.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:
1. A fluid flow component comprising:
a fluid connection having a cross-section, said fluid connection cross-section having part circular end portions formed by a portion of a circle and extending generally straight side portions connecting said end portions such that said fluid connection cross-section is an elongated and non-circular surface;

a seal groove formed in said fluid connection, said seal groove having inwardly extending portions at an outer end to capture an o-ring within seal groove straight sides;

a circular o-ring having an o-ring body centered on a central axis, and said o-ring body also having a circular cross-section received within said seal groove;

said o-ring has a diameter, and said fluid connection end portions are the furthest spaced portions of said fluid connection cross-section, and spaced by a distance, and a ratio of said diameter to said distance is less than 1;

said circular o-ring is mounted on said elongated, non-circular surface; and wherein said inwardly extending portions are each dovetails.

2. The fluid flow component as set forth in claim 1, wherein said inwardly extending portions are not formed at said part circular end portions.

3. The fluid flow component as set forth in claim 1, wherein said fluid flow component is a manifold.

4. The fluid flow component as set forth in claim 3, wherein said fluid connection has an inner boss and an outer boss with said seal groove including seal grooves formed in each of said inner and outer bosses.

5. The fluid flow component as set forth in claim 4, wherein said manifold has at least two fluid connections.

6. The fluid flow component as set forth in claim 1, wherein said fluid connection has an inner boss and an outer boss with said seal groove including seal grooves formed in each of said inner and outer bosses.

7. The fluid flow component as set forth in claim 1, wherein said fluid flow component has at least two fluid connections.

8. A system comprising:
a component body for performing a chemical process to remove carbon dioxide and water from airflow and recirculate the airflow to a use for breathable air on a spacecraft;

fluid conduits selectively communicating to a manifold to, in turn, communicate to said component body;

said manifold having a fluid connection received in a bore in said component body;

said fluid connection having a cross-section with end portions formed by a portion of a circle and extending generally straight side portions connecting said end portions;

a seal groove formed in said fluid connection, said seal groove having inwardly extending portions at an outer end to capture an o-ring within said seal groove;

a circular o-ring having an o-ring body centered on a central axis, and said o-ring body also having a circular cross-section received within said seal groove; and wherein said o-ring has a diameter, and said fluid connection end portions are the furthest spaced portions of said fluid connection cross-section, and spaced by a distance, and a ratio of said diameter to said distance is less than 1.

9. The system as set forth in claim 8, wherein said inwardly extending portions are each dovetails.

10. The system as set forth in claim 9, wherein said inwardly extending portions are not formed at said end portions.

11. The system as set forth in claim 10, wherein said fluid connection has an inner boss and an outer boss with said seal groove including seal grooves formed in each of said inner and outer bosses.

12. The system as set forth in claim 11, wherein said manifold has at least two fluid connections.

13. The system as set forth in claim 9, wherein said manifold has at least two fluid connections.

14. The system as set forth in claim 8, wherein said inwardly extending portions are not formed at said end portions.

15. The system as set forth in claim 8, wherein said fluid connection has an inner boss and an outer boss with said seal groove including seal grooves formed in each of said inner and outer bosses.

16. The system as set forth in claim 8, wherein said manifold has at least two fluid connections.

17. A fluid flow component comprising:
a fluid connection having a cross-section, said fluid connection cross-section having part circular end portions formed by a portion of a circle and extending generally straight side portions connecting said end portions such that said fluid connection cross-section is an elongated and non-circular surface;

a seal groove formed in said fluid connection, said seal groove having inwardly extending portions at an outer end to capture an o-ring within seal groove straight sides;

a circular o-ring having an o-ring body centered on a central axis, and said o-ring body also having a circular cross-section received within said seal groove;

said o-ring has a diameter, and said fluid connection end portions are the furthest spaced portions of said fluid connection cross-section, and spaced by a distance, and a ratio of said diameter to said distance is less than 1;

said circular o-ring is mounted on said elongated, non-circular surface; and wherein said inwardly extending portions are not formed at said part-circular end portions.

* * * * *